United States Patent
Takahashi et al.

(10) Patent No.: US 6,501,366 B2
(45) Date of Patent: *Dec. 31, 2002

(54) THERMISTOR-TYPE TEMPERATURE SENSOR

(75) Inventors: Sotoo Takahashi, Okazaki (JP); Matsuo Fukaya, Oobu (JP)

(73) Assignee: Denso Corporation, Aichi-Pref. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,005

(22) Filed: May 19, 1999

(65) Prior Publication Data

US 2002/0084884 A1 Jul. 4, 2002

(30) Foreign Application Priority Data

May 20, 1998 (JP) .............................. 10-138847
Mar. 15, 1999 (JP) .............................. 11-068869

(51) Int. Cl.[7] ................................................. H01C 3/04
(52) U.S. Cl. ........................... 338/25; 338/28; 374/185
(58) Field of Search ..................... 338/13, 20, 22 R, 338/225 D, 306, 314, 226, 275, 25, 28, 30; 374/185, 208

(56) References Cited

U.S. PATENT DOCUMENTS

| | | | |
|---|---|---|---|
| 3,305,820 A | * | 2/1967 | Lennox ........................ 338/28 |
| 3,696,502 A | * | 10/1972 | Darling ....................... 29/527.7 |
| 3,709,667 A | * | 1/1973 | Selman et al. .............. 29/182.5 |
| 3,779,714 A | * | 12/1973 | Nadkarni et al. ........... 29/182.5 |
| 3,958,209 A | * | 5/1976 | Soda et al. ................. 338/22 R |
| 4,002,503 A | * | 1/1977 | Bourne et al. ............ 148/11.5 P |
| 4,513,737 A | | 4/1985 | Mabuchi |
| 4,819,859 A | * | 4/1989 | Schwenninger ............. 228/190 |
| 5,497,139 A | * | 3/1996 | Takahashi et al. ......... 338/22 SD |
| 5,632,557 A | * | 5/1997 | Simmons .................... 374/148 |
| 6,081,182 A | * | 6/2000 | Tomozawa et al. .......... 338/25 |
| 6,130,598 A | * | 10/2000 | Katsuki et al. ............. 338/28 |

FOREIGN PATENT DOCUMENTS

| | | | |
|---|---|---|---|
| EP | 0 680 053 A2 | 11/1995 | |
| EP | 0 795 879 A1 | 9/1997 | |
| JP | 5569029 | * 5/1980 | ................. 338/30 |
| JP | 55-129715 | 10/1980 | |
| JP | 5-185273 | 7/1993 | |
| JP | 6-336631 | 12/1994 | |
| JP | 9-126910 | 5/1997 | |
| JP | 9-218110 | 8/1997 | |
| JP | 10-208905 | 8/1998 | |

* cited by examiner

Primary Examiner—Karl D. Easthom
(74) Attorney, Agent, or Firm—Nixon & Vanderhye PC

(57) ABSTRACT

The present invention provides a thermistor-type temperature sensor equipped with a thermistor element having a thermistor section and electrode wires for acquiring thermistor signals that prevent breakage of electrode wires caused by high-frequency vibrations.

Thermistor element (10) is equipped with thermistor section (11) and electrode wires (12) and (13) made of a dispersion-strengthened material having for its main component platinum or platinum alloy, and is insulated and held in cylindrical metal case (40) having opening (42) on one end by means of insulating powder (50). A bottomed, cylindrical metal protective tube (60) houses metal case (40) so that its bottom (61) covers opening (42). Heat-resistant adhesive (70) is juxtaposed in a gap between metal case (40) and protective tube (60) so as to seal opening (42) to-prevent insulting powder (50) from spilling into this gap from opening (42).

4 Claims, 2 Drawing Sheets

GRAIN BOUNDARY

CRYSTAL GRAIN

CRYSTAL GRAIN

GRAIN BOUNDARY

THERMISTOR-TYPE TEMPERATURE SENSOR

BACKGROUND OF THE INVENTION

1. Field of the Invention

The present invention relates to a temperature sensor incorporating a thermistor element that is used to detect temperature in various locations, and which is suited for use as a high-temperature thermistor-type temperature sensor that detects catalyst temperature and exhaust system temperature in diesel engines and gasoline engines.

2. Description of the Related Art

In high-temperature thermistor-type temperature sensors that detect catalyst temperature and exhaust system temperature in diesel engines and gasoline engines of the prior art, a thermistor element equipped with a thermistor section and electrode wires (normally platinum wires) for acquisition of thermistor signals is housed in a cylindrical case. In order to prevent breakage of the platinum wires by absorbing mechanical stress due to engine vibrations and the temperature fluctuating from nearly −40° C. to nearly 1000° C., an opening in one end of the cylindrical case is filled with an insulating cushioning material such as alumina powder around the thermistor element to form a unit structure.

Moreover, in order to prevent entry of exhaust gas from the above opening in the cylindrical case as well as preventing the insulating cushioning material from spilling outside the case, the above-mentioned cylindrical case is inserted, from the end containing the above-mentioned opening, into a bottomed cylindrical metal tube. As a result, a double cylinder structure is formed that houses the above-mentioned unit, employing a form in which the above-mentioned opening is covered with the bottom of the metal tube.

However, accompanying higher engine speeds resulting from enhanced engine performance in recent years, due to the sensor holding structure at the site where the sensor is attached (catalyst or exhaust pipe, etc.) being reinforced, vibrations of greater magnitude are applied to the sensor at higher frequencies (e.g., 1 kHz or higher). Consequently, problems relating to the breakage of the platinum wires are becoming increasingly common, as indicated below, due to these intense, high-frequency vibrations.

The first problem is caused by the insulating cushioning material. In the above-mentioned structure of the prior art, spilling of insulating cushioning material to the outside is prevented by covering the opening in the cylindrical case with a metal tube, since the case is inserted into a metal tube. However, an extremely narrow gap (on the order of several tenths of a millimeter) neccessarily exists between the case and metal tube.

Here, when intense, high-frequency vibrations are applied to the sensor, the insulating cushioning material housed inside the case causes vibrations at the granular level due to the high frequency. These granules gradually break up and form tiny fragments that are able to enter the above-mentioned gap. Consequently, these tiny fragments spill out into the above-mentioned gap from the above-mentioned opening resulting in a loss of the thermistor element holding function and eventually leading to the risk of breakage of the electrode wires by vibration.

Another problem is caused by the material structure of the electrode wires themselves. Namely, although platinum wires are normally used for the electrode wires, according to a study conducted by the inventors of the present invention, during the course of manufacturing thermistor elements, the crystal grains of the platinum material become increasingly coarse in the firing process during which the platinum wires are molded by being embedded in a thermistor material (normally a semiconductor material) and firing (shrink-fitting) at 1300–1600° C. Intense, high-frequency vibrations induce shifting at the grain boundary of the coarse crystals, thereby leading to the risk of grain boundary breakage of the platinum wires.

In this manner, the potential for breakage of electrode wires of thermistor elements will become even greater in the future due to the high-frequency vibrations accompanying higher engine speeds.

Therefore, in consideration of the above-mentioned problems of the prior art, the object of the present invention is to prevent breakage of the electrode wires caused by high-frequency vibrations in a thermistor-type temperature sensor equipped with a thermistor element having a thermistor section and electrode wires for acquiring thermistor signals.

SUMMARY OF THE INVENTION

The present invention was achieved by focusing on the two points consisting of (1) providing the thermistor element with a holding structure function so that insulating cushioning material does not come out of the case even if it breaks up, and (2) providing the platinum material used for the electrode wires with a structure so that the crystal grains do not become coarse even if exposed to high temperatures.

Namely, a first aspect of the present invention is characterized by being a thermistor-type temperature sensor equipped with a thermistor element equipped with a thermistor section and electrode wires extending from the thermistor section, a cylindrical electrically conducting first case having an opening in one end that houses the thermistor element, an insulating cushioning material of coagulated powder that is housed in the first case from the opening and insulates and holds the thermistor element in the first case, and a second case having a bottomed, or closed-ended, shape that houses and holds the first case so that the bottom covers the opening; wherein, a heat-resistant adhesive is juxtaposed between the first case and second case so as to at least seal the opening.

The above-mentioned "coagulated powder" means a state of powder which is not sintered but can be shaved by a finger nail, and usually attained by heating a powder or slurry of an inorganic oxide to a temperature of 700° C. to 1000° C., preferably 800° C. to 1000° C.

This aspect of the present invention is based on the above-mentioned point (1). As a result of juxtaposing a heat-resistance adhesive between the above-mentioned first case and above-mentioned second case so as to at least seal the above-mentioned opening, even if the insulating cushioning material housed inside the first case is broken up and forms tiny fragments due to high-frequency vibrations, it can be prevented from spilling out from the opening into the gap between the first case and second case. Consequently, the thermistor element holding function can be maintained, and breakage of the electrode wires due to high-frequency vibrations can be. prevented. Furthermore, the heat resistance of the adhesive is preferably that which can withstand temperatures of, for example, 1000° C. in consideration of exhaust temperature sensors and so forth.

The above-mentioned adhesive is preferably also disposed at the portion corresponding to the portion in which the insulating cushioning material of the first case is housed between the first and second case.

Although an insulating cushioning material of coagulated powder is normally filled into the first case from the opening in one end and contained in the form of a powder or slurry, in order to improve the ease of filling, a hole for venting air may also be provided in the portion of the first case in which the insulating cushioning material is contained in addition to the opening. Thereafter, the powder or slurry is heated to be coagulated. Thus, in this case, if the above-mentioned adhesive is disposed at the portion corresponding to the portion at which the insulating cushioning material of the first case is contained, the insulating cushioning material can be prevented from spilling out since the hole other than the opening can be sealed, thereby making it possible to prevent breakage of the electrode wires.

The temperature sensor of the above-mentioned first aspect includes a temperature sensor which has a so-called axial type of thermistor element. This temperature sensor is equipped with a wiring member for acquiring thermistor signals from the above-mentioned electrode wires to the outside which member comprises an electrically conductive outer tube electrically connected with the above-mentioned first case at the end opposite from the above-mentioned opening of the above-mentioned first case, and an electrically conductive core wire insulated and held within this outer tube;

the above-mentioned electrode wires are composed of a pair of electrode wires; and, one of the electrode wires of the above-mentioned pair of electrode wires extends to the opposite side of the above-mentioned opening from the above-mentioned thermistor section and is electrically connected to the above-mentioned core wire, while the other electrode wire extends to the side of the above-mentioned opening and is electrically connected with the above-mentioned first case.

Moreover, on the basis of the above-mentioned second point (2), the inventors of the present invention earnestly conducted studies on an electrode wire material that does not break even if the insulating cushioning material breaks up, comes out of the case and the thermistor element is subjected to high-frequency vibrations. As a result, the inventors of the present invention invented the second and third aspects described below.

The second aspect of the present invention is a thermistor-type temperature sensor equipped with a thermistor element equipped with a thermistor section composed of a thermistor material and electrode wires for acquiring thermistor signals extending from this thermistor section, with the above-mentioned electrode wires being made of a dispersion-strengthened material having platinum or platinum alloy for its main component.

In this aspect of the present invention, the increasing coarseness of the crystal grains of the platinum material that occurs in the firing process of the thermistor element as described above is suppressed. Since high-frequency vibrations do not lead to breakage of the electrode wires even if they induce shifting of the grain boundary of the crystals, breakage of the above-mentioned electrode wires can be prevented.

It is preferable that the above-mentioned dispersion-strengthened material be a material in which 0.02 wt % or more of a metal oxide is added if the amount of platinum or platinum alloy is taken to be 100 wt %. Although the metal oxide has the function of suppressing increased coarseness of grains of platinum or platinum alloy, if the amount of said metal oxide is less than 0.02 wt %, it is unable to sufficiently suppress increasing coarseness of the grains of platinum or platinum alloy.

Moreover, it is preferable that said metal oxide be added at 2 wt % or less when the amount of platinum or platinum alloy is taken to be 100 wt % (namely, added within the range of 0.02–2 wt %). If the amount of metal oxide added is greater than 2 wt %, the ease of drawing of the electrode wire is dramatically impaired and the resistance of the electrode wire itself increases, thus making it difficult to adequately detect changes in the resistance of the thermistor element.

At least one type of substance selected from zirconia, yttrium, alumina and titania can be used for the above-mentioned metal oxide. Platinum alloy containing, alloyed with the platinum, at least one type of substance selected from rhodium, gold, tungsten and palladium can be used for the above-mentioned platinum alloy in order to improve the strength of the electrode wires.

Moreover, it is preferable that the crystal grain size in the direction of wire diameter of the electrode wires made of the above-mentioned dispersion-strengthened material be smaller than the wire diameter, and particularly preferably that grain size be one-half the wire diameter or less.

The effect of preventing wire breakage by the above-mentioned dispersion-strengthened material is sufficiently demonstrated even in electrode wires that are fixed to the thermistor section by shrink-fitting.

Use of the electrode wires made from a dispersion-strengthened material having for its main component platinum or platinum alloy as described above in the temperature sensor of the first aspect makes it possible to demonstrate an effect that combines the effects of both aspects.

A third aspect of the present invention is a thermistor-type temperature sensor equipped with a thermistor element equipped with a thermistor section comprising a thermistor material, and electrode wires extending from the thermistor section for acquiring thermistor signals; wherein, the electrode wires are composed of alloy wire of platinum and iridium. The use of this type of electrode wires makes the electrode wires themselves resistant to vibrations, thereby realizing prevention of wire breakage caused by high-frequency vibrations. Here, it is preferable that a platinum alloy be used for said alloy wire material in which the alloy composition consists of the addition of 1–60 wt % of iridium with the remainder consisting of platinum in consideration of wire drawing, thinning and breakage.

The above-mentioned electrode wires composed of an alloy wire material consisting of platinum and iridium sufficiently demonstrate the effect of preventing wire breakage even when the electrode wires are fixed to the above-mentioned thermistor section by shrink-fitting.

In addition, use of the electrode wires of the third aspect of the present invention as electrode wires of the first aspect of the present invention makes it possible to demonstrate an effect that combines the effects of both aspects.

The thermistor-type temperature sensor of the above-mentioned second and third aspects of the present invention may be equipped with a thermistor element equipped with a thermistor section made of a thermistor material and a pair of electrode wires extending in the same direction from the thermistor section for acquisition of thermistor signals, a wiring member comprising a pair of electrically conductive core wires connected to the above-mentioned electrode wires and an outer tube that covers said core wires by means of insulating powder for acquiring the above-mentioned thermistor element signals to the outside, and a cover that houses the above-mentioned thermistor element and welded to the outer tube of the above-mentioned wiring member;

wherein, the above-mentioned electrode wires are those of the second or third aspects of the present invention.

BRIEF DESCRIPTION OF THE DRAWINGS

The following provides an explanation of the present invention through its preferred embodiment with reference to the drawings. The present embodiment applies the thermistor-type temperature sensor of the present invention to a high-temperature thermistor-type temperature sensor that detects the catalyst temperature and exhaust system temperature of diesel engines and gasoline engines. FIG. 1 shows the cross-sectional composition of thermistor-type temperature sensor 100 pertaining to the present embodiment.

Figure 1:
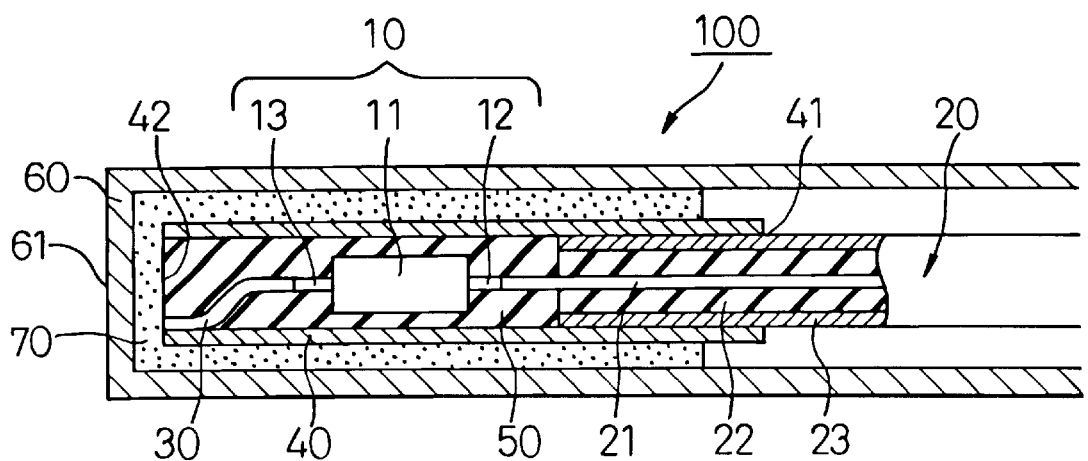
FIG. 1 is a cross-sectional view of a thermistor-type temperature sensor relating to an embodiment of the present invention.

Reference numeral 10 is a thermistor element for high temperatures that is able to withstand use at high temperatures (e.g., 1000° C. and above), and is composed of, for example, a cylindrical thermistor section 11 made of a semiconductor material (thermistor material) having for its main component Cr—Mn, and a pair of electrode wires (platinum electrodes) 12 and 13 for acquiring output signals (resistance (R)—temperature (T) characteristics) from thermistor section 11.

Electrode wires 12 and 13 are separate rod-shaped wires (see FIG. 4A) made of a dispersion-strengthened material (e.g., roughly 0.3–1.0 mm in diameter) having for its main component platinum or platinum alloy having crystal stability even when exposed to high temperatures. In addition to one of their respective ends being embedded and shrink-fit in thermistor section 11, they extend in mutual opposition in the column axial direction of thermistor section 11, thereby being of the axial type. Furthermore, each of the embedded ends of electrode wires 12 and 13 are separated within thermistor section 11. Thermistor element 10 has electrode wires 12 and 13 embedded and formed in both of the axial ends of thermistor section 11, and is formed by firing at a high temperature of 1300–1600° C.

The end of electrode wire 12 on the opposite side from the embedded end is connected by welding to core wire 21 of mineral insulated cable 20 to be described later, and is led to an external control circuit by means of a lead wire not shown from the other end of mineral insulated cable 20 not shown. On the other hand, the end of electrode wire 13 on the opposite side from the embedded end is welded and fixed to ground lead wire 30, and welded to the inside of metal case 40 to be described later by means of this ground lead wire 30. Here, connection of each electrode wire 12 and 13 to each wire 21 and 30 may be performed by inserting each wire to be connected from both directions of a stainless steel pipe and welding.

The above-mentioned mineral insulated cable (wiring member) 20 is composed of metal core wire 21 made of, for example, SUS310S, MgO or other insulating powder 22, and metal outer tube 23 made of, for example, SUS310S. Since mineral insulated cable 20 is formed by repeatedly thinning the outer diameter of outer tube 23 while annealing, the core wire 21 is securely fixed within insulating powder 22 that is packed to a high density.

The above-mentioned metal case (first case) houses the thermistor element 10, and is formed from a heat-resistant, electrically conductive metal such as SUS310S into the shape of a thin-walled cylinder having openings in both ends. Outer tube 23 of mineral insulated cable 20 is inserted into opening 41 in one end of metal case 40, and is welded and fixed, at the portion it overlaps, to the metal the case 40. Thus, opening 41 of metal case 40 has a form in which it is blocked by mineral insulated cable 20.

Coagulated insulating powder (insulating cushioning material) 50 such as $Al_2O_3$ is filled into the gap of the portion that houses thermistor element 10 within metal case 40, resulting in a form in which thermistor element 10 is insulated and held within the metal case 40. The coagulated insulating powder 50 is made by mixing a powder with water to form a slurry, which is filled into the metal case 40 from opening 42 of the metal case 40 on the opposite side from opening 41 into which mineral insulated cable 20 is inserted. Thereafter the slurry is heated at a temperature preferably from 700° C. to 1000° C., more preferably 800° C. to 1000° C., most preferably at 900° C., and coagulated, thereby insulating and holding thermistor element 10.

Furthermore, a hole, not shown, that acts as an air vent is provided in the portion of the circumference of metal case 40 in which insulating powder 50 is contained to facilitate filling during filling of insulating powder 50 from opening 42.

In this manner, thermistor signals (R-T characteristics) can be acquired by an external control circuit from electrode wire 12 extending from thermistor section 11 towards opening 41 by means of core wire 21, and from electrode wire 13 extending from thermistor section 11 towards opening 42 by means of ground lead wire 30 and metal case 40.

In addition, the unit composed of thermistor element 10, mineral insulated cable 20, ground lead wire 30, metal case 40 and insulating powder 50 is covered by a protective tube (second case) 60 in the shape of a closed-ended cylinder made of a metal such as SUS310S. Protective tube 60 covers opening 42 of metal case 40 with the inner surface of its bottom 61.

Heat-resistant adhesive 70 composed of, for example, a heat-cured, alumina-based curing adhesive is filled into roughly the entire gap (e.g., several tenths of a millimeter) between the outer surface of metal case 40 and the inner surface of protective tube 60. Here, it is preferable that adhesive 70 have heat resistance of at least, for example, 1000° C. in consideration of the working temperature when used as an exhaust temperature sensor, and examples of such an adhesive include Sumiselam (trade name) manufactured by Asahi Chemical Company, Limited.

Adhesive 70 is disposed at the section of the gap between metal case 40 and protective tube 60 (to be simply referred to as the gap) corresponding to the section within metal case 40 into which insulating powder 50 is filled while sealing opening 42 of metal case 40 in opposition to bottom 61 of protective tube 60, and also sealing the above-mentioned air venting hole (not shown). In this embodiment, adhesive 70 is also partially disposed in the portion of the gap corresponding to the portion at which mineral insulated cable 20 is housed within metal case 40.

Assembly of the unit composed by thermistor element 10, mineral insulated cable 20, ground lead wire 30, metal case 40 and insulating powder 50 with protective tube 60 and adhesive 70 is performed as described below. After inserting the above-mentioned unit from the side of opening 42 into protective tube 60 filled with an adhesive such as alumina-based curing adhesive, the above-mentioned adhesive is heat-cured. In this manner, an assembly is formed in which adhesive 70 is disposed between the gaps.

Next, an explanation is provided of the operation of the present embodiment.

A temperature from about −40° C. to 1000° C. is applied from the environment in which the high temperature sensor shown in FIG. 1 is installed to the temperature sensing portion of said high temperature sensor, resulting in the occurrence of thermal stress due to thermal expansion and contraction of the composite members by the cold or heat. At this time, if insulating powder 50 fixes and holds thermistor element 10 in a finely-packed, firm state, thermal stress cannot be completely absorbed resulting in the occurrence of breakage of electrode wire 12 or 13 or ground lead wire 30 and so forth. Consequently, in the present embodiment, the insulating powder 50 that holds and fixes thermistor element 10 absorbs movement caused by thermal stress by forming minute gaps between the grains of insulating powder 50 in the coagulated state as previously described.

However, when high-frequency vibrations, and particularly those of 1 kHz or more, produced at high engine speeds and so forth are applied to the unit composed with the above-mentioned members 10 through 50 (sensor temperature sensing portion), the insulating powder 50 solidified in the coagulated state vibrates at the grain level and gradually breaks up into tiny fragments. At this time, since adhesive 70 filled into the gap between protective tube 60 and metal case 40 seals opening 42, an outflow of insulating powder 50 from metal case 40 can be prevented, making it possible to retain the holding function of thermistor element 10 and prevent breakage of electrode wires 12 and 13 by high-frequency vibrations.

Figure 2A:
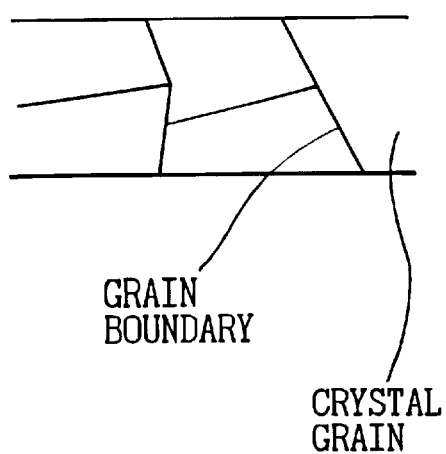
FIGS. 2A and 2B are schematic drawings showing the crystal structure of platinum wire under high temperatures.
Figure 2B:
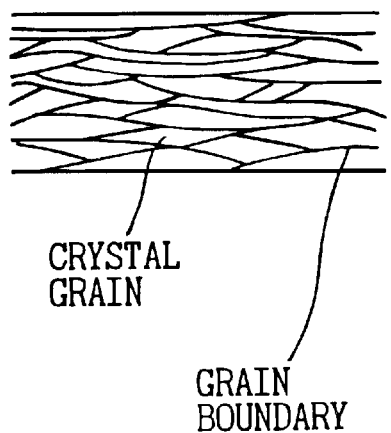

In addition, since electrode wires 12 and 13 use the above-mentioned dispersion-strengthened material having crystal stability even when exposed to high temperatures, the application of high-frequency vibrations does not lead to rupture of the grain boundary, thereby making it possible to prevent wire breakage. Here, the crystal structure of the above-mentioned dispersion-strengthened material under a high temperature (900° C.×100 hours) is shown in FIG. 2. FIG. 2 is a drawing schematically illustrating a microscopic image. FIG. 2A shows the crystal structure of electrode wires composed of conventionally used ordinary platinum (Comparative Example), while FIG. 2B shows the crystal structure of electrode wires composed of the above-mentioned dispersion-strengthened material of the present embodiment.

In the case of ordinary platinum, the platinum crystal grains become. increasingly coarse in a high-temperature environment, and platinum crystal grain size in the direction of wire diameter reaches a maximum level equal to wire diameter. When intense, high-frequency vibrations induce shifting at the grain boundary of the crystal grains at a level that is equal to wire diameter, the wires end up breaking. However, in the case of the above-mentioned dispersion-strengthened material, platinum crystal grain size in the direction of wire diameter is smaller than wire diameter, and wire breakage does not result even if the above-mentioned shifting of the grain boundary is induced. Furthermore, it is preferable that grain size be one-half wire diameter or less.

Here, in order to adequately suppress increasing coarseness of the grains of platinum and platinum alloy, it is preferable that a metal oxide of the above-mentioned dispersion-strengthened material be added at 0.02 wt % or more when taking the amount of platinum or platinum alloy to be 100 wt %.

Moreover, in order to prevent excessive resistance of electrode wires 12 and 13 themselves as well as adequately detect resistance changes of thermistor element 10, it is preferable that said metal oxide be added at 2 wt % or less when taking the amount of platinum or platinum alloy to be 100 wt %.

Here, at least one type of substance selected from, for example, zirconia, yttrium, alumina and titania can be used for said metal oxide.

In addition, platinum alloy containing, relative to the platinum, at least one type of metal selected from, for example, rhodium, gold, tungsten and palladium can be used for the above-mentioned platinum alloy. The strength of electrode wires 12 and 13 themselves can be improved by using this type of platinum alloy.

Other Embodiments

Furthermore, in the above-mentioned embodiment, although two means are used in combination consisting of (1) filling adhesive 70 into the gap between the unit composed of thermistor element 10 and so forth and protective tube 60 housing said unit, and (2) using the above-mentioned dispersion-strengthened material for the electrode wires of the thermistor, breakage of electrode wires caused by high-frequency vibrations can also be prevented even if (1) or (2) is carried out alone.

In the above-mentioned embodiment, although electrode wires 12 and 13 are made of the above-mentioned dispersion-strengthened material, they may also be composed of alloy wires of platinum and iridium. As a result, the wires themselves can be made stronger with respect to vibrations, thereby making it possible to realize prevention of wire breakage caused by high-frequency vibrations. Here, it is preferable to use a platinum alloy for said alloy wire of platinum and iridium in which the alloy composition is such that 1–60 wt % of iridium is added and the remainder consists of platinum in consideration of the ease of drawing, thinning, cutting and other wire processing.

Figure 3:
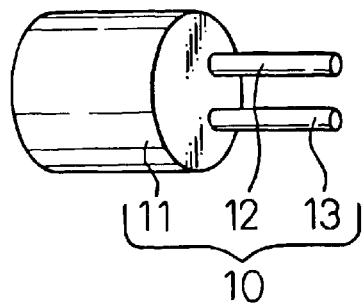
FIG. 3 is a perspective view showing the structure of a radial thermistor element.

Although the above-mentioned embodiment is an axial type of thermistor element, even in a structure that uses a radial type in which electrode wires 12 and 13 for acquisition of thermistor signals as shown in FIG. 3 are extending in the same direction to compose a pair of electrode wires 12 and 13, the same effect is obtained if the above-mentioned dispersion-strengthened material or the above-mentioned alloy wire is used for electrode wires 12 and 13.

Figure 4A:
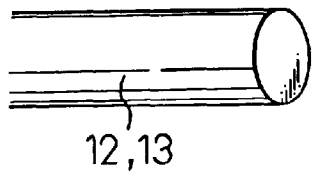
FIGS. 4A and 4B are perspective views showing the form of electrode wires.
Figure 4B:
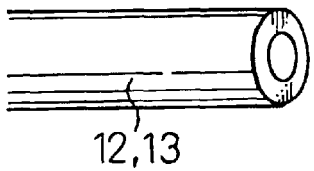

In the above-mentioned embodiment, although a rod-shaped wire as shown in FIG. 4A is used for electrode wires 12 and 13, the wire may also be in the form of a pipe as shown in FIG. 4B. In this case, it is preferable that the core wire of the mineral insulated cable and ground lead wire are inserted and fixed in the pipe lumen.

In the above-mentioned embodiment, although electrode wires made of a dispersion-strengthened material, having for its main component platinum or platinum alloy, are fixed by shrink-fitting after being embedded in the thermistor material, they may also be fixed by joining by a high-temperature dispersion reaction of the electrode wires and thermistor material, or by an adhesion method in which a platinum or other electrically conductive paste is juxtaposed between the electrode wires and thermistor material.

Figure 5:
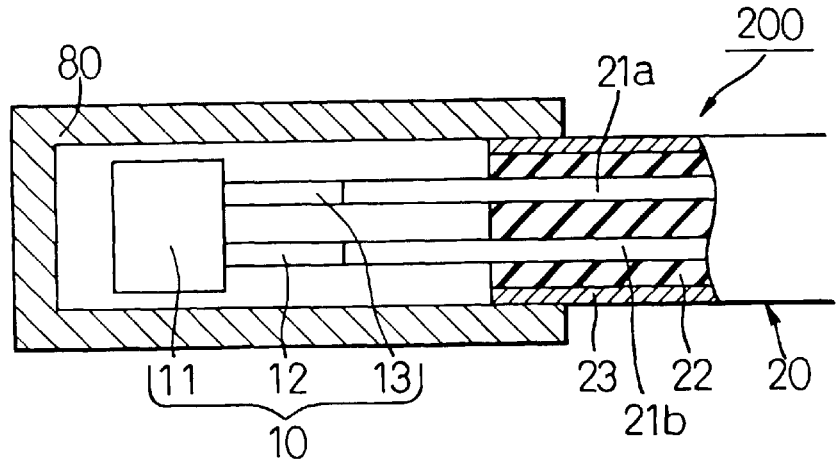
FIG. 5 is a cross-sectional view of a thermistor-type temperature sensor relating to another embodiment of the present invention.

Another example of a thermistor-type temperature sensor of the present invention is shown in FIG. 5. This temperature sensor 200 uses the radial type of thermistor element 10 shown in the above-mentioned FIG. 3. In temperature sensor 200, mineral insulated cable 20 is of a two-core composition, and is composed of, for example, a pair of electrically conductive core wires 21a and 21b made of a metal such as SUS310S, and outer tube 23 that covers these core wires 21a and 21b by way of insulating powder 22.

A pair of electrode wires 12 and 13 of thermistor element 10 are respectively connected to a pair of core wires 21a and 21b, and can be used to access an external control circuit by means of mineral insulated cable 20. In addition, as shown in FIG. 5, thermistor element 10 is protected by being housed in metal cap (cover) 80 composed of heat-resistant metal in the shape of a closed-ended cylinder. This metal cap 80 is fixed by being welded to the outer circumference of outer tube 23 of mineral insulated cable 20. While, in the embodiment shown in FIG. 5, there is no insulating powder between thermistor element 10 and metal cap 80 but rather a cavity, insulating powder may be filled to improve strength against vibrations.

In this temperature sensor 200 as well, wire breakage caused by intense, high-frequency vibrations can be prevented if electrode wires 12 and 13 are composed of the above-mentioned dispersion-strengthened material or alloy wire of platinum and iridium.

What is claimed is:

1. A thermistor-type temperature sensor for determining a temperature of exhaust gas from an engine, comprising:
    a thermistor element having a thermistor section made of a thermistor material, and a pair of electrode wires constructed and arranged to conduct thermistor signals, said wires extending in the same direction from said thermistor section and one end of each of said wires being fixed to the thermistor section by shrink fitting,
    a wiring member comprising a pair of electrically conductive core wires connected to said electrode wires and an outer tube that covers said core wires and contains an insulating powder, the core wires constructed and arranged to conduct signals from said thermistor element out of the outer tube, and
    a cover, housing said thermistor element that is welded and fixed to said outer tube of said wiring member wherein said electrode wires comprise a dispersion-strengthened material consisting essentially of 100 wt % of platinum and 0.02–2 wt % of metal oxide, or an alloy of platinum and iridium, said dispersion-strengthened material having crystal grains oriented along a longitudinal axis of said electrode wires and said crystal grain size of said dispersion-strengthened material being one-half the wire diameter or less.

2. A thermistor-type temperature sensor according to claim 1 wherein said metal oxide is at least one type selected from zirconia, yttrium oxide, alumina and titania.

3. A thermistor-type temperature sensor according to claim 1 wherein a crystal grain size of said dispersion-strengthened material in the direction of wire diameter is smaller than the wire diameter.

4. A thermistor-type temperature sensor according to claim 1 wherein the alloy of platinum and iridium comprises 1–60 wt % of iridium with the remainder substantially platinum.

* * * * *